United States Patent Office 3,098,760
Patented July 23, 1963

3,098,760
DIMENSIONAL STABILIZATION OF CELLULOSE
Walter P. Ericks, Lockport, N.Y., assignor to The
Upson Company, Lockport, N.Y.
No Drawing. Filed Feb. 7, 1961, Ser. No. 87,539
12 Claims. (Cl. 117—143)

The present invention relates to the treatment of materials composed essentially of cellulose and, more particularly, to the treatment of such materials to improve their dimensional stability during adsorption and desorption of water by them while maintaining or improving their desirable physical characteristics.

It is well known that when cellulose takes on water, either in the form of water vapor from the surrounding atmosphere, or by contact with water in the liquid state, it expands and that, conversely, when it liberates the adsorbed water it contracts. This property gives rise to many problems. For example, paper containing line drawings which must be accurate to very close tolerances, will expand and contract so much upon mere changes in the humidity of the surrounding atmosphere that the dimensions of the drawings will vary considerably more than is specified. Also, there may be mentioned the case of photographic prints which comprise paper coated with a film which expands and contracts to a different degree than the paper, itself, so that when a photographic print is developed by a conventional wet process and dried, the print will tend to cup and curl.

In my copending application Serial No. 87,538, filed February 7, 1961, now abandoned, I have described the dimensional stabilization of materials composed essentially of cellulose by impregnating them with esters of glycol monoethers. While all such esters have been found to dimensionally stabilize cellulose to a considerable degree, the stabilized products are unsuitable for some purposes because the esters also have a pronounced softening or plasticizing action on cellulose, resulting in a soft and flaccid article. Moreover, cellulose articles impregnated with these esters are sometimes lacking in tensile strength and resistance to water.

This problem has been solved to a degree by including varying amounts of a thermosetting resin, such as a urea-formaldehyde, phenol-formaldehyde or melamine-formaldehyde resin in an early stage of condensation in the impregnating solution containing the ester and then, after impregnation, heating the article to dry it and set the resin. This, however, has the disadvantage that the resins are expensive and that in many instances such large amounts are required to obtain the strength and stiffness desired that undesirable properties are imparted to the cellulose article being treated.

Accordingly, it is an object of the invention to provide a simple and inexpensive process for dimensionally stabilizing articles composed predominantly of cellulose to produce dimensionally stabilized products. It is a further object of the invention to provide dimensionally stabilized articles composed predominantly of cellulose which have high tensile strength, good resistance to water and any desired degree of stiffness.

According to the present invention, it has been found that the above objects can be achieved by impregnating the material composed of cellulose with an ester of an unsaturated aliphatic carboxylic acid and a monoalkyl, monoalkoxyalkyl, monoaryl or monoalkaryl ether of an alkylene or polyalkylene glycol and copolymerizing all or a portion of the ester with a compatible polymerizable liquid monomeric compound containing an ethylenic linkage; for example, vinyl, allyl and acrylic monomers, to form a resinous copolymer.

The monoethers suitable for the preparation of the esters for use in the present invention may be expressed by the general formula $$RO(R^1O)_nH$$

where R is an alkyl, alkoxyalkyl, aryl, or alkaryl group, $R^1$ is an alkylene group and $n$ is an integer between 1 and 110. As exemplary of monoethers of glycols which may be employed, there may be mentioned: triethylene glycol monomethyl ether, triethylene glycol monoethyl ether, tripropylene glycol monomethyl ether, ethylene glycol monophenyl ether, ethylene glycol mono-n-hexyl ether, diethylene glycol monomethyl ether, diethylene glycol monoethyl ether, diethylene glycol mono-n-butyl ether, diethylene glycol mono-n-hexyl ether, propylene glycol monobutoxyethyl ether $$(C_4H_9OC_2H_4OCH_2CH(OH)CH_3)$$

propylene glycol monomethyl ether, diethylene glycol monobenzyl ether, tetraethylene glycol monoethyl ether, ethylene glycol monomethyl ether, ethylene glycol monoethyl ether, ethylene glycol monobutyl ether, dipropylene glycol monomethyl ether and the like.

Either unsaturated aliphatic monocarboxylic or unsaturated aliphatic dicarboxylic acids may be used for the preparation of esters suitable for use in the practice of the present inventions but it is preferred that a dicarboxylic acid be employed, particularly an $\alpha,\beta$-unsaturated dicarboxylic acid. If a dicarboxylic acid is employed, one or both of the carboxyl groups may be reacted with a glycol monoether to form either a partial ester containing one reacted and one unreacted carboxyl group or a neutral ester wherein both of the carboxyl groups in the molecule are esterified. The esterification of both carboxyl groups in the molecule of dicarboxylic acid can be accomplished with the same glycol monoether to form a symmetric ester or with different monoethers to form an asymmetric ester.

As exemplary of unsaturated aliphatic carboxylic acids, their anhydrides or chlorides suitable for use in the preparation of the esters to be employed in this invention, there may be mentioned the following: maleic acid, maleic anhydride, fumaric acid, itaconic acid, itaconic anhydride, citraconic acid, glutaconic anhydride, dimethyl citraconic acid, dimethyl mesaconic acid, dimethyl itaconic acid, dimethyl itaconic acid, mesaconic acid, hexene-(2)-dicarboxylic acid, hexene-(3)-dicarboxylic acid, $\alpha$-methyl glutaconic acid (cis and trans), $\beta$-methyl glutaconic acid (cis and trans), ethyl maleic acid, ethyl fumaric acid, $\gamma$-methyl itaconic acid, $\alpha$-methyl itaconic acid, dimethyl maleic acid, dimethyl fumaric acid, trans-ethyl mesaconic acid, cis-ethyl citraconic acid, trans-propyl mesaconic acid, cis-ethyl citraconic acid, trans-propyl mesaconic acid, cis-propyl citraconic acid, $\delta$-hexylene $\alpha,\delta$-dicarboxylic acid, $\gamma$-propyl itaconic acid, $\beta$-propyl glutaconic acid, $\gamma$-n-hexyl itaconic acid, fumaryl chloride, bromofumaric acid, iodofumaric acid, chloroiodofumaric acid, chloromaleic acid, dichloromaleic acid, allyl malonic acid, nonenyl succinic acid, acrylic acid, crotonic acid, methacrylic acid, vinyl acetic acid, angelic acid, tiglic acid, oleic acid, $\alpha$-bromo-acrylic acid, $\beta$-chloroisocrotonic acid, allylacetic acid, $\alpha$-ethyl-acrylic acid, $\beta,\beta$-dimethylacrylic acid, $\beta$-propyl-acrylic acid, $\beta$-propylidene-propionic acid, $\alpha$-ethyl crotonic acid, $\alpha$-butyl-acrylic acid, $\beta$-methyl-$\beta$-propyl acrylic acid, teracrylic acid, $\beta$-vinyl-iso-valerionic acid, $\beta$-n-amyl-acrylic acid, $\alpha,\beta$-isooctenic acid and the like.

The preparation of the esters suitable for use in the present application is described in my aforementioned copending application Serial No. 87,538.

There are a large number of compatible polymerizable liquid monomeric compounds containing an ethylenic linkage which may be employed for copolymerization with the monomeric esters just described in accordance with the present invention. Vinyl, acrylic and allyl monomers have already been mentioned as exemplary of compounds of this type and, of these, the vinyl compounds are preferred. The one compound which has been found most desirable for copolymerization with the unsaturated ester is styrene, both because it is commercially available and relatively inexpensive, and becasue particularly siutable properties are imparted to the final product when this material is used.

The following is a listing of other specific compounds which are exemplary of those which may be copolymerized with the monomeric unsaturated esters in carrying out this invention: α-methyl styrene, dichlorostyrene, vinyl toluene, vinyl acetate, vinyl butyrate, acrylic acid, methacrylic acid, methyl methacrylate, N-vinyl-2-pyrrolidone, diallyl phthalate, diallyl diglycollate, diallyl maleate, vinyl chloride, ethyl vinyl ether, isopropyl vinyl ether, and n-propyl vinyl ether.

Cellulose articles may be impregnated by a one-stage impregnation technique with either the individual reactants which subsequently form the desired unsaturated ester or with a preformed monomeric unsaturated ester and polymerizable liquid monomer in a single impregnating solution. For the best results, however, a two-step impregnation must be used. In accordance with this procedure, the cellulose material is impregnated with a solution containing the unsaturated ester, dried, then impregnated with the liquid polymerizable monomer and, finally, heated to copolymerize the ester and vinyl, or similar, monomer to form in situ the resin which gives the final product the desirable properties enumerated above. Apparently by this technique the unsaturated ester molecule is better able to attach itself to the cellulose molecule in such a way as to exert a maximum dimensional stabilizing effect.

In carrying out the preferred two-stage impregnation, one may, if the unsaturated ester of the glycol monoether is a readily flowable liquid, use it undiluted to impregnate the cellulose material, but it is preferred that it be dissolved in a solvent to provide suitable impregnating solutions. Whenever the ester is sufficiently soluble in water, it is preferred that water be employed as the solvent, both for reasons of economy and for safety and ease in handling. In many instances, however, the ester is insoluble in water or its solubility is so limited as to make water unsatisfactory as a solvent. In such cases the ester may be dissolved in an organic solvent, such as a low molecular weight alcohol or a low molecular weight ketone, or a mixture of such an organic solvent and water. Preferably, the solvent employed should have a boiling point at atmospheric pressure below 105° C. so that the impregnated cellulose material may readily be dried after treatment, the differential between the boiling point of the stabilizing agent and the solvent being sufficiently great that on heating, the solvent is removed without removing any appreciable amount of stabilizing agent.

The impregnation may be effected by any suitable procedure, but it is preferred that it be accomplished by immersing the cellulose material in the impregnating solution with the excess of the impregnating solution being removed by pressure as by passing the material between two pressure rolls. In the case where the cellulose material is in sheet form, the impregnating solution may be applied to its surface and then allowed to penetrate into the sheet before the solvent is removed by evaporation.

The concentration of the impregnating solution will be determined by the amount of stabilizer to be introduced into the cellulose material being treated. While the stabilizing effect is dependent upon the quantity of the stabilizing compound incorporated into the cellulose material being treated, and this quantity can vary widely, the exact quantity to be incorporated will be determined by the type of material, the nature of the stabilizing compound and the amount of normal expansion and contraction which is to be removed. Under certain conditions of use, the removal of as much as 12 or 15% of the normal expansion and contraction of cellulose may be all that is necessary, whereas under other conditions of use, it may be desirable to remove up to 60 or 70% or more of this normal expansion and contraction. In most instances, at least 1% by weight of the ester stabilizer is required to bring about any appreciable dimensional stabilization of a cellulose material and there is seldom any reason to incorporate more than 50% of the stabilizing substance into the cellulose material based on the dry weight of the impregnated product. In general, a range of 5 to 30% by weight is preferred.

Having determined the amount of stabilizer which is to be incorporated, it is a simple matter to arrive at a proper concentration of the impregnating solution. By simple tests, the amount of solution which will be absorbed upon complete impregnation may be determined and the concentration of the solution is adjusted accordingly.

After drying, which is preferably carried out by heating the wet impregnated article to a temperature at which the solvent is sufficiently volatile, usually about 100 to 120° C., it is impregnated with the vinyl, or similar, monomer with which the unsaturated ester is to be copolymerized. The amount of this monomer present as copolymer will determine the stiffness of the final product, and, accordingly, it is apparent that no definite figure or range can be set forth as critical in this regard, the upper limit, of course, being set by the amount of the unsaturated ester which is present. In general, however, it may be stated that from 1 to 35% of the compound having an ethylenic linkage should be present as copolymer in the final product based on the dry weight thereof and this copolymer may represent the interaction of the polymerizable monomer with all or only a part of the ester which is present in the material being treated.

It has been found that in most instances, a satisfactory final product will be obtained by saturating the dry article, impregnated with an unsaturated ester, with liquid monomeric compound by dipping the article in a bath of this compound for a short period of time, and then heating the article impregnated with the liquid monomer to copolymerize it with the unsaturated ester already present. The temperature of this heating will usually be of the order of 50 to 120° C., and many of the compounds suitable for copolymerization, including the preferred compound, styrene, is so volatile at these temperatures that it has been found desirable to confine the article during heating to prevent a susbtantial loss of the liquid monomer. As a simple expedient for accomplishing this purpose, the article being treated is wrapped in a metallic foil, such as aluminum foil.

To minimize the evaporation of vinyl monomer, the unsaturated ester which was impregnated into the cellulose article can be made to copolymerize at room temperature with a vinyl compound thereby forming a gel which subsequently, is converted into a hard copolymer by heat treatment.

Heating is terminated when copolymerization is substantially complete, and this will usually be after heating for a period of 15 to 60 minutes. Any excess monomer remaining may readily be removed by evaporation by heating the unconfined article.

The copolymerization is preferably catalyzed. Conventional polymerization catalysts such as the organic peroxides have been found suitable and, as exemplary, there may be mentioned methyl ethyl ketone peroxide, methyl amyl ketone peroxide, t-butyl perbenzoate, benzoyl peroxide, p-methane hydroperoxide, lauroyl peroxide, t-butyl hydroperoxide and the like.

Promoters for the copolymerization reaction should also be present and as examples of conventional promoters which may be employed, there may be mentioned the following: cobalt salts such as cobalt naphthenate, ferrous salts such as the ferrous salt of diethylene glycol monomaleate, manganese naphthenate and diethylaniline.

The catalyst and promoter are preferably dissolved in the liquid monomeric compound which is employed to impregnate the cellulose article. The amount of catalyst in the monomer will preferably range from 0.5 to 3.0% by weight, and the amount of promoter from .05 to 5.0% by weight as effective ingredient based on the weight of monomer.

As stated earlier, while the above method involving the impregnation of the reactants into the cellulose article in two stages is that preferred because the finished product has greater dimensional stability and strength, some of the advantages of the present invention are realized by a method involving one-stage impregnation. In accordance with this procedure, a single solution is used for impregnating a cellulose material and this solution has dissolved therein the desired amounts of monomeric compound containing an ethylenic linkage, preferably a vinyl compound, and either a preformed monomeric unsaturated ester of any of the types described above, or the individual reactants which will produce such an ester upon heating.

Again, if possible, water is used as a solvent, but it is only in a relatively small number of cases that all of the ingredients of the solution will be water-soluble. If it is possible to use an aqueous solution, a water-soluble catalyst for the copolymerization such as sodium or potassium persulfate should be employed. The liquid unsaturated monomer containing an ethylenic linkage is, of course, itself a solvent for the unsaturated esters, and therefore impregnating solutions may be employed which contain no other solvent. However, such solventless mixtures are usually so viscous as to make impregnation of the cellulose material difficult and therefore it is ordinarily preferred to use an organic solvent in preparing the impregnating solution. This solvent may be of the type mentioned earlier, i.e. a low-boiling alcohol or ketone, and may be used by itself or in admixture with water. When a solvent is employed, whether it be aqueous or organic in nature, it will be evaporated during the heating of the impregnated cellulose material to effect copolymerization, and accordingly, in this instance, the material cannot be confined during heating or at least not during the initial stages thereof.

The temperatures and times of heating employed in a process using the one-stage impregnation will correspond with those mentioned earlier in connection with the two-stage impregnation process and similar proportions of reactants may be used. In each case, it is preferred that a catalyst and promoter be included in the impregnating solution and, when an organic solvent solution is used, the catalyst is preferably of the organic peroxide type mentioned above.

The following examples are set forth as being illustrative of but not as limiting the present invention:

*Example 1*

Cellulose fiber sheets of 0.06" caliper prepared on cylinder paper machine from unsized newsprint stock were impregnated with aqueous solutions containing 3.75, 7.5, 15 and 30% of the unsaturated monoester obtained by reacting equimolecular quantities of diethylene glycol monomethyl ether and maleic anhydride at 120–150° C. The impregnation was carried out by keeping the sheets submerged in the clear solutions at room temperature until a control sheet showed that they were completely impregnated. The quantity of the monoester absorbed was determined by weighing the sheets dried at 110° C. before and after impregnation and was found to be 5, 12, 19 and 32%, respectively. The impregnated sheets were further impregnated by dipping them for 1–2 seconds into monomeric styrene containing 0.13% cobalt naphthenate solution (6% Co) and 1.3% of t-butylperbenzoate and then wrapping them in aluminum foil to prevent excessive evaporation of styrene during subsequent heating and copolymerizing at 110° C. for one hour. The percent styrene retained as copolymer was determined by the difference in weight of the singly and doubly impregnated samples. The sheets containing 5, 12, 19 and 32% of the monoester were found to contain 12, 24, 17 and 8% of copolymerized styrene, respectively, and they lost 16, 44, 51 and 68%, respectively, of their normal hygroexpansivity in an atmosphere of varying humidity. All of the sheets containing the copolymer possessed improved tensile strength and resistance to water absorption as compared to those of unimpregnated sheets.

*Example 2*

Cellulose fiber sheets were impregnated with 3.75, 7.5, 15 and 30% aqueous solutions of the ester prepared by reacting at 120–150° C. equimolecular quantities of ethylene glycol monoethyl ether and maleic anhydride. After heating to remove the solvent, the sheets contained 6, 9, 19 and 31% of the ester.

In accordance with the procedure described in Example 1, the sheets were subsequently impregnated with styrene containing cobalt naphthenate as promoter and t-butylperbenzoate as catalyst. They were then wrapped in aluminum foil and heated for one hour at 110° C. The cellulose fiber sheets impregnated with 6, 9, 19 and 31% ester contained 21, 21, 16 and 7% copolymerized styrene and showed 39, 47, 55 and 75%, respectively, of their hygroexpansivity removed. The dry and wet tensile strength and the resistance to water absorption of the copolymer impregnated sheets had increased substantially as compared to those of the unimpregnated sheets.

*Example 3*

Cellulose fiber sheets were impregnated with 3.75, 7.5, 15 and 30% solutions in a solvent consisting of 50 parts of water and 50 parts of isopropanol of an unsaturated monoester prepared by reacting equimolecular quantities of diethylene glycol monobutyl ether and maleic anhydride. The dried sheets contained 6, 10, 17 and 29% of the ester.

These sheets were dipped in styrene which was subsequently copolymerized with the ester in the sheet as described in Example 1. The impregnated fiber sheets containing 6, 10, 17 and 29% of the monoester were found to contain 20, 24, 19 and 14% of copolymerized styrene and they lost 48, 56, 65 and 74%, respectively, of their normal contraction and expansion. All sheets thus treated had improved tensile strengths and resistance to water absorption as compared to the untreated sheets.

*Example 4*

Cellulose sheets were impregnated with 3.75, 7.5, 15 and 30% aqueous solutions of the unsaturated monoester prepared by reacting equimolecular quantities of triethylene glycol monomethyl ether and fumaric acid at 160–180° C. until one-half of the original acidity was consumed in the monoester formation. The dried sheets contained 5, 11, 20 and 33% of the ester.

The impregnated sheets when further impregnated with styrene monomer in the manner described in Example 1 contained 26, 20 and 17% copolymerized styrene and they lost 40, 51, 68 and 73%, respectively, of their hygroexpansivity. The tensile strength and resistance to water absorption of the copolymer containing sheets had been improved substantially as compared to the untreated sheets.

*Example 5*

Cellulose fiber sheets were impregnated with 3.75, 7.5, 15 and 30% solutions in a solvent composed of 50 parts isopropanol and 50 parts of water of the ester obtained by reacting equimolecular quantities of diethylene glycol monobutyl ether and itaconic acid at 135–150° C. After heating and drying, the sheets contained 5, 8, 16 and 30% of the ester.

The ester impregnated sheets were then quickly immersed in styrene and the monomeric ester and styrene were copolymerized as described in Example #1. The sheets were found to contain 5, 16, 16 and 15% copolymerized styrene and showed 39, 47, 68 and 81%, respectively, of their hygroexpansivity removed. The tensile strength and the resistance to water absorption of the copolymer treated sheets had increased appreciably as compared to the unimpregnated sheets.

*Example 6*

The unsaturated monoester obtained by reacting equimolecular quantities of triethylene glycol monoethyl ether and maleic anhydride was impregnated into cellulose fiber sheets using aqueous solutions of 3.75, 7.5 and 15% ester concentration. The dried sheets contained 6, 11 and 20% of the ester and after subsequent impregnation with styrene they also contained 21, 17 and 18% copolymerized styrene and showed 23, 51 and 68%, respectively, of their hygroexpansivity removed. The tensile strength and resistance to water absorption of the impregnated sheets were substantially improved as compared to unimpregnated sheets.

*Example 7*

Cellulose fiber sheets were impregnated with 3.75, 7.5 and 15% aqueous solutions of the unsaturated monoester obtained by reacting equimolecular quantities of triethylene glycol monomethyl ether and maleic anhydride. The dried sheets contained 5, 12 and 17% of the ester and after impregnation with styrene and copolymerization they also contained 26, 16 and 15% of copolymerized styrene and showed, respectively, 45, 50 and 46% hygroexpansivity removed. The copolymer impregnated sheets had improved tensile strengths and resistance to water absorption as compared to the unimpregnated sheets.

*Example 8*

Cellulose fiber sheets impregnated with 3.75, 7.5, 15 and 30% solution of monoester, obtained by reacting equimolecular quantities of diethylene glycol monobutyl ether and nonenyl succinic anhydride, contained, after drying the sheets, 5, 8, 14 and 24% of the ester and after impregnation with styrene and copolymerization they also contained 21, 21, 17 and 15% copolymerized styrene. They lost 35, 41, 48 and 47%, respectively, of their original contraction and expansion. The copolymer treated sheets possessed improved tensile strength and increased water resistance as compared to the untreated sheets.

*Example 9*

Cellulose fiber sheets were impregnated with 3.75, 7.5 and 15% solutions of the ester prepared by reacting equimolecular quantities of ethylene glycol monoethyl ether and nonenyl succinic anhydride dissolved in a solvent composed of 80 parts isopropanol and 20 parts of water. The impregnated sheets contained, after drying, 6, 10 and 14% of the ester and after subsequent impregnation with styrene and copolymerization, they also contained 24, 21 and 19% copolymerized styrene and lost 42, 54 and 48%, respectively, of their contraction and expansion. The tensile strength and water resistant properties of the impregnated sheets were improved appreciably as compared to the unimpregnated sheets.

*Example 10*

Cellulose fiber sheets were impregnated with 3.75, 7.5 and 15% solutions of the monoester prepared by reacting equimolecular quantities of dipropylene glycol monomethyl ether and fumaric acid dissolved in a solvent composed of 60 parts of isopropanol and 40 parts of water. After drying, to remove the solvent, the sheets contained 5, 9 and 15% of the ester and after impregnation with styrene and copolymerization, they also contained 15, 16 and 14% copolymerized styrene and showed 22, 35 and 53%, respectively, of their hygroexpansivity removed. The tensile strength and water resistance of the copolymer impregnated sheets had been greatly improved as compared to untreated sheets.

*Example 11*

Cellulose fiber sheets were impregnated with 3.75 and 7.5% solutions of the ester obtained by reacting equimolecular quantities of diethylene glycol monobutyl ether and fumaric acid dissolved in a solvent composed of 80 parts isopropanol and 20 parts water. The dried sheets contained 5 and 9% ester and after subsequent impregnation with styrene and copolymerization, they contained 10 and 13% copolymerized styrene and showed 29 and 39%, respectively, of their hygroexpansivity removed. The copolymer treated sheets had improved tensile strength and resistance to water absorption as compared to the untreated sheets.

*Example 12*

Cellulose fiber sheets were impregnated with a solution composed of 30 parts of the monoester prepared by reacting equimolecular quantities of ethylene glycol monobutyl ether and maleic anhydride, 28 parts of isopropanol and 42 parts of water. The sheets, after drying, contained 26% ester. After impregnation with styrene and copolymerization, they contained 24% copolymerized styrene and showed 74% hygroexpansivity removed. The tensile strength of the impregnated sheets was improved as compared to the untreated sheets.

*Example 13*

Cellulose fiber sheets were impregnated with 3.75, 7.5 and 15% solutions of the ester prepared by reacting equimolecular quantities of dipropylene glycol monomethyl ether and maleic anhydride dissolved in a solvent composed of 30 parts of isopropanol and 70 parts of water. After drying by heating, the sheets contained 7, 11 and 18% of the ester and after subsequent impregnation with styrene and copolymerization, they contained 14, 18 and 14% copolymerized styrene. The resulting sheets showed 34, 51 and 72%, respectively, of their hygroexpansivity removed. The tensile strength and resistance to water absorption of the impregnated sheets were substantially improved as compared to those of the untreated sheets.

*Example 14*

Cellulose fiber sheets were impregnated with a 15% aqueous solution of the monoester prepared by reacting equimolecular quantities of propylene glycol monomethyl ether and maleic anhydride. The dried sheets contained 18% ester and after impregnation with styrene and copolymerization, the sheets contained 10% copolymerized styrene. They showed 50% hygroexpansivity removed. The tensile strength and resistance to water absorption of the impregnated sheets were increased as compared to the unimpregnated sheets.

*Example 15*

Cellulose fiber sheets were impregnated with 3.75, 7.5 and 15% solutions in a solvent composed of 50 parts of isopropanol and 50 parts of water of the monomeric, symmetric, unsaturated ester obtained by reacting an excess of dipropylene glycol monomethyl ether with maleic anhydride at 160–170° C. The sheets after drying contained 6, 9 and 10% of the ester and after subsequent impregnation with styrene and copolymerization, they also contained 18, 24 and 16% of copolymerized styrene. The sheets lost 39, 50 and 54%, respectively, of their normal hygroexpansivity in an atmosphere of varying humidity. All impregnated sheets had improved tensile strength and increased resistance to water absorption as compared to the unimpregnated sheets.

Example 16

Cellulose fiber sheets were impregnated with 3.75, 7.5 and 15% solutions of the monomeric, symmetric, unsaturated ester obtained by reacting an excess of propylene glycol monomethyl ether with maleic anhydride dissolved in a solvent composed of 55 parts of isopropanol and 45 parts of water. The sheets, after drying, contained 5, 8 and 16% of the ester and after subsequent impregnation with styrene and copolymerization, they also contained 15, 15 and 6% copolymerized styrene. They showed 40, 55 and 61%, respectively, of their hygroexpansivity removed. The tensile strength and resistance to water absorption of the impregnated sheets were improved appreciably as com-

Example 17

Cellulose fiber sheets were impregnated with 3.75, 7.5, 15 and 30% solutions of the symmetric ester obtained by reacting an excess of diethylene glycol monobutyl ether with the monoester described in Example 11 dissolved in a solvent composed of 70 parts of isopropanol and 30 parts of water. The sheets, after drying, contained 5, 9, 15 and 25% of the ester and after impregnation with styrene and copolymerization, they contained 18, 22, 16 and 12% of copolymerized styrene and showed 42, 61, 69 and 74%, respectively, of their hygroexpansivity removed. The impregnated sheets had substantially improved tensile strength and increased resistance to water absorption as compared to untreated sheets.

Example 18

Cellulose fiber sheets were impregnated with 3.75, 7.5, 15 and 30% aqueous solutions of the symmetric ester obtained by reacting an excess of triethylene glycol monomethyl ether and the monoester described in Example 4. After drying by heating, the sheets contained 6, 12, 19 and 32% of the ester and after impregnation with styrene and copolymerization, they contained 25, 32, 24 and 22% copolymerized styrene and showed 45, 63, 67 and 69%, respectively, of their hygroexpansivity removed. The tensile strength and resistance to water absorption of the impregnated sheets were increased appreciably as compared to the untreated sheets.

Example 19

Cellulose fiber sheets were impregnated with 3.75, 7.5, 15 and 30% aqueous solutions of the ester prepared by reacting an excess of diethylene glycol monomethyl ether with the monoester described in Example 1. The dried sheets contained 6, 11 and 19% of the ester and after impregnation with styrene and copolymerization, they contained 19, 20 and 14% copolymerized styrene. They showed 28, 46 and 61%, respectively, of their hygroexpansivity removed. All of the impregnated sheets had increased tensile strength and water resistance as compared with the untreated sheets.

Example 20

Cellulose fiber sheets were impregnated with 3.75, 7.5 and 15% solutions of the symmetric ester prepared by reacting an excess of ethylene glycol monoethyl ether and the monoester described in Example 2 dissolved in a solvent composed of 40 parts of isopropanol and 60 parts of water. The sheets, after drying, contained 6, 9 and 17% of the ester and after impregnation with styrene and copolymerization, they contained 20, 22 and 20% copolymerized styrene and showed 36, 49 and 70%, respectively, of their hygroexpansivity removed. The impregnated sheets had improved tensile strength and increased water resistance as compared to the unimpregnated sheets.

Example 21

Cellulose fiber sheets were impregnated with 3.75, 7.5 and 15% solutions of the ester prepared by reacting an excess of diethylene glycol monobutyl ether with the monoester of Example 3 dissolved in a solvent composed of 70 parts of isopropanol and 30 parts of water. The sheets, after drying, contained 5, 9 and 16% ester and after impregnation with styrene and copolymerization, they contained 27, 25 and 23% copolymerized styrene. They showed 47, 54 and 68%, respectively, of their hygroexpansivity removed. The tensile strength and resistance to water absorption of the impregnated sheets were increased as compared to the unimpregnated sheets.

Example 22

Cellulose fiber sheets were impregnated with 3.75, 7.5 and 15% solutions of the monomeric ester prepared by reacting an excess of triethylene glycol monoethyl ether with the monoester described in Example 6 dissolved in a solvent composed of 30 parts of isopropanol and 70 parts of water. The sheets, after drying, contained 5, 10 and 18% ester and after impregnation with styrene and copolymerization, they contained 28, 25 and 23% copolymerized styrene. They showed 43, 56 and 71%, respectively, of their hygroexpansivity removed. All copolymer treated sheets had substantially improved tensile strength and increased water resistance as compared to the untreated sheets.

Example 23

Cellulose fiber sheets were impregnated with 3.75, 7.5 and 15% solutions of the ester prepared by reacting an excess of ethylene glycol monoethyl ether with the monoester described in Example 9 dissolved in a solvent composed of 70 parts of isopropanol and 30 parts of water. The sheets, after drying, contained 5, 8 and 15% of the ester and after subsequent impregnation and copolymerization with styrene, they contained 23, 22 and 24% copolymerized styrene. They showed 28, 35 and 48%, respectively, of their hygroexpansivity removed. The tensile strength and resistance to water absorption of the impregnated sheets were improved as compared to the unimpregnated sheets.

Example 24

Cellulose fiber sheets were impregnated with 3.75, 7.5 and 15% solutions of the symmetric ester prepared by reacting an excess of dipropylene glycol monomethyl ether with the monoester described in Example 10 dissolved in a solvent composed of 60 parts of isopropanol and 40 parts of water. The sheets, after drying, contained 5, 9 and 15% of the ester and after subsequent impregnation with styrene and copolymerization, they contained 12, 14 and 17% copolymerized styrene. They showed 19, 29 and 50%, respectively, of their hygroexpansivity removed. All impregnated sheets had improved tensile strength and increased water resistance as compared to the untreated sheets.

Example 25

Cellulose fiber sheets were impregnated with a 30% solution of the symmetric ester prepared by reacting an excess of ethylene glycol monobutyl ether with the monoester described in Example 12 dissolved in a solvent composed of 80 parts of isopropanol and 20 parts of water. The dried sheets contained 26% ester. After impregnation with styrene and copolymerization, the sheets contained 21% copolymerized styrene and showed 75% hygroexpansivity removed. The tensile strength of the impregnated sheets was improved as compared to unimpregnated sheets.

Example 26

Cellulose fiber sheets were impregnated with 3.75, 7.5, 15 and 30% solutions of the monomeric, asymmetric, unsaturated glycol ether ester prepared by reacting equimolecular quantities of diethylene glycol monobutyl ether and maleic anhydride followed by reacting the monoester, so formed, with an excess of diethylene glycol monoethyl ether. In these solutions, the ester was dissolved in a solvent composed of 40 parts of isopropanol and 60 parts of water. The dried sheets contained 3, 6, 12 and 20% of the ester and after subsequent impregnation with styrene and copolymerization, they contained 23, 29, 32 and 25% copolymerized styrene. They lost 35, 50, 75 and 82%, respectively, of their normal contraction and expansion. All impregnated sheets had substantially increased tensile strength and resistance to water absorption as compared to the untreated sheets.

It will be seen that in the examples set forth above the cellulose material treated is in sheet form and composed of cellulose fibers in their natural state. It should be understood, however, that an improved dimensional stability will be effected in the case of any material composed of cellulose, the molecules of which have the characteristic cellulose structure. Thus, products composed of fibers of regenerated cellulose may be dimensionally stabilized and their physical characteristics improved by the present process. As exemplary of such products there may be mentioned rayon textiles. It should be emphasized, however, that the advantages of the invention are realized to the greatest extent in connection with materials which are formed of cellulose in its natural fibrous state, such as paper or cardboard.

The fact that the copolymers are resinous in nature makes possible the ready production of laminated products. Individual felted fibrous cellulose sheets may be impregnated with a monomeric liquid such as styrene and an unsaturated carboxylic acid ester of a monoether of a glycol in the manner set forth above. The sheets are placed one upon the other and, without being subjected to pressure, are heated to copolymerize the unsaturated ester and the monomer. This produces a dimensionally stable laminate, the individual plies of which are firmly adhered one to the other.

I claim:
1. A process of preparing a dimensionally stabilized sheet composed of cellulose fibers, comprising impregnating said sheet with (1) from 1 to 50% based on the weight of said sheet of a monomeric ester of an unsaturated aliphatic carboxylic acid and a monoether of a glycol, said monoether having the general formula

$$RO(R'O)_nH$$

where R is a member selected from the group consisting of alkyl, alkoxyalkyl, aryl and alkaryl groups, R' is an alkylene group and n is an integer between 1 and 110, and (2) a compatible polymerizable liquid monomeric compound containing an ethylenic linkage; and heating said impregnated sheet to copolymerize said ester and said monomeric compound to form a resin, said sheet containing as copolymer at least 1% of said monomeric compound based on the weight of said sheet.

2. The process of preparing a dimensionally stabilized sheet composed of cellulose fibers, comprising impregnating said sheet with a solvent solution containing a monomeric ester of an unsaturated aliphatic carboxylic acid and a monoether of a glycol, said monoether having the general formula $$RO(R'O)_nH$$

where R is a member selected from the group consisting of alkyl, alkoxyalkyl, aryl and alkaryl groups, R' is an alkylene group and n is an integer between 1 and 110; heating said impregnated sheet to drive off said solvent without removing said ester, said solvent solution containing sufficient of said ester that the dried impregnated sheet contains from 1 to 50% of said ester based on the weight of said sheet; impregnating said sheet containing said ester with a compatible polymerizable liquid monomeric compound containing an ethylenic linkage; and heating said sheet containing said ester and said monomeric compound to copolymerize said ester and said monomeric compound, said sheet containing as copolymer at least 1% of said monomeric compound based on the weight of said sheet.

3. The process of claim 2 in which said polymerizable liquid monomeric compound is selected from the group consisting of vinyl, allyl and acrylic monomers.

4. The process of claim 3 in which said polymerizable monomeric compound is styrene.

5. The process of claim 2 in which said ester is an ester of an unsaturated aliphatic dicarboxylic acid.

6. The process of claim 5 in which said dicarboxylic acid is an $\alpha,\beta$-unsaturated dicarboxylic acid.

7. The process of claim 6 in which said ester is one in which only one carboxyl group of said dicarboxylic acid is esterified.

8. The process of claim 6 in which said ester is one in which both of the carboxyl groups of said dicarboxylic acid are esterified.

9. The process of claim 8 in which said ester is one in which both of the carboxyl groups of said dicarboxylic acid are esterified with the same glycol monoether.

10. The process of claim 8 in which said ester is one in which both of the carboxyl groups of said dicarboxylic acid are esterified but with different glycol monoethers.

11. The process of claim 6 in which said polymerizable monomeric compound is styrene.

12. An article prepared by the process of claim 1.

References Cited in the file of this patent

UNITED STATES PATENTS

| | | |
|---|---|---|
| 2,255,313 | Ellis | Sept. 9, 1941 |
| 2,940,854 | Gray | June 14, 1960 |
| 2,978,354 | Lesser | Apr. 4, 1961 |

FOREIGN PATENTS

| | | |
|---|---|---|
| 1,025,302 | Germany | Feb. 27, 1958 |